(12) United States Patent  (10) Patent No.: US 9,959,840 B2
Nunes et al.  (45) Date of Patent: *May 1, 2018

(54) MULTIMEDIA SERVERS THAT BROADCAST PACKET-SWITCHED AUDIO WITH SECOND SCREEN CONTENT

(71) Applicants: Bryan Nunes, Sunnyvale, CA (US); Paul Baker, Lathrop, CA (US)

(72) Inventors: Bryan Nunes, Sunnyvale, CA (US); Paul Baker, Lathrop, CA (US)

(73) Assignee: Bryan Nunes, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/190,191

(22) Filed: Jun. 23, 2016

(65) Prior Publication Data

US 2017/0374241 A1 Dec. 28, 2017

(51) Int. Cl.
*G09G 5/14* (2006.01)
*H04N 21/43* (2011.01)
(Continued)

(52) U.S. Cl.
CPC ............ *G09G 5/14* (2013.01); *G06F 3/1462* (2013.01); *G06Q 30/0241* (2013.01); *H04H 20/61* (2013.01); *H04L 12/2838* (2013.01); *H04L 65/4015* (2013.01); *H04L 65/4084* (2013.01); *H04L 65/602* (2013.01); *H04L 65/605* (2013.01); *H04L 69/28* (2013.01); *H04N 21/233* (2013.01); *H04N 21/41* (2013.01);
(Continued)

(58) Field of Classification Search
CPC ............ H04N 21/439; H04N 21/4307; H04N 21/4821; H04N 21/233; H04N 21/4524; H04N 21/4126; H04W 4/023; H04W 40/244; H04W 88/02; H04W 4/06; H04W 4/206; H04H 20/61; H04L 65/605; H04L 65/4015; H04L 6/00
See application file for complete search history.

(56) References Cited

U.S. PATENT DOCUMENTS 7,039,048 B1 * 5/2006 Monta ................. H04L 12/2801
370/389
7,827,574 B1 * 11/2010 Hendricks .............. H04H 20/42
725/14
(Continued)

OTHER PUBLICATIONS

Anthony, Introducing Roku 4, the Best Roku Streaming Player Ever, Oct. 6, 2015, The Official Roku Blog.*

*Primary Examiner* — Hoang Vu A Nguyen Ba
(74) *Attorney, Agent, or Firm* — David E. Crites (57) ABSTRACT

An apparatus, system, or method wirelessly sends an audio component of a multimedia channel to one or more wireless computing devices while a visual component of the multimedia channel is playing on a video monitor. The audio component may be packetized into data packets and broadcast via a network such that the data packets can be received and played by the wireless computing devices in synchronization with the visual component playing on the video monitor. A channel listing may inform the wireless computing devices what channels are available. A visual content that is not the visual component of the multimedia channel may be displayed on the wireless computing device while an audio component of the multimedia channel is streamed to the wireless computing device.

18 Claims, 6 Drawing Sheets

(51) Int. Cl.

| | |
|---|---|
| *H04N 21/41* | (2011.01) |
| *H04L 29/06* | (2006.01) |
| *H04N 21/482* | (2011.01) |
| *G06F 3/14* | (2006.01) |
| *H04L 12/28* | (2006.01) |
| *G06Q 30/02* | (2012.01) |
| *H04W 4/06* | (2009.01) |
| *H04H 20/61* | (2008.01) |
| *H04W 88/02* | (2009.01) |
| *H04W 40/24* | (2009.01) |
| *H04N 21/45* | (2011.01) |
| *H04N 21/233* | (2011.01) |
| *H04W 4/02* | (2018.01) |
| *H04N 21/439* | (2011.01) |
| *H04W 4/21* | (2018.01) |

(52) U.S. Cl.
CPC ......... *H04N 21/4126* (2013.01); *H04N 21/43* (2013.01); *H04N 21/4307* (2013.01); *H04N 21/439* (2013.01); *H04N 21/4524* (2013.01); *H04N 21/482* (2013.01); *H04N 21/4821* (2013.01); *H04W 4/023* (2013.01); *H04W 4/06* (2013.01); *H04W 4/21* (2018.02); *H04W 40/244* (2013.01); *H04W 88/02* (2013.01)

(56) References Cited

U.S. PATENT DOCUMENTS

| | | | |
|---|---|---|---|
| 8,719,874 | B2 | 5/2014 | Vance |
| 8,818,815 | B2* | 8/2014 | Evenden ........... H04L 29/06027 704/270.1 |
| 2002/0143805 | A1* | 10/2002 | Hayes ................... G06F 1/1626 345/169 |
| 2004/0123103 | A1 | 6/2004 | Risan et al. |
| 2005/0259681 | A1* | 11/2005 | Lai ........................ H04W 88/06 370/466 |
| 2008/0040215 | A1* | 2/2008 | Huang ................... G06Q 30/02 705/14.73 |
| 2008/0141315 | A1* | 6/2008 | Ogilvie .................... H04N 7/15 725/77 |
| 2008/0175140 | A1* | 7/2008 | Mudulodu .......... H04L 25/0224 370/210 |
| 2008/0183853 | A1 | 7/2008 | Manion et al. |
| 2009/0003600 | A1 | 1/2009 | Chen et al. |
| 2009/0007193 | A1* | 1/2009 | Correa .................. H04H 20/62 725/76 |
| 2009/0077595 | A1* | 3/2009 | Sizelove ............... G06F 1/1626 725/76 |
| 2011/0035766 | A1* | 2/2011 | Reynolds ........... H04N 7/17318 725/14 |
| 2011/0170004 | A1 | 7/2011 | Nunes |
| 2014/0002738 | A1 | 1/2014 | Nunes |

\* cited by examiner

NOW SHOWING

| Channel | Program | Description | Location |
|---|---|---|---|
| 14 NBC | 🏈 Sunday Night Football | 49ers vs. Lions | ⬈ |
| • | • | • | |
| • | • | • | |
| • | • | • | |

OTHER AVAILABLE CHANNELS

| Channel | Program | Description | Location |
|---|---|---|---|
| 38 ESPN | 🏈 NFL Football | Denver vs. Patriots | NA |
| • | • | • | |
| • | • | • | |
| • | • | • | |

MULTIMEDIA SERVERS THAT BROADCAST PACKET-SWITCHED AUDIO WITH SECOND SCREEN CONTENT

CROSS REFERENCE TO RELATED APPLICATIONS

The methods of U.S. Provisional Patent Application Ser. No. 61/294,085, filed on Jan. 11, 2010; U.S. patent application Ser. No. 13/004,847 titled "SYSTEM AND METHOD FOR PROVIDING AN AUDIO COMPONENT OF A MULTIMEDIA CONTENT DISPLAYED ON AN ELECTRONIC DISPLAY DEVICE TO ONE OR MORE WIRELESS COMPUTING DEVICES" filed on Jan. 11, 2011; and the methods of U.S. patent application Ser. No. 14/016,148 titled "AUDIO APPARATUS THAT EXTRACTS THE AUDIO OF A MULTIMEDIA CHANNEL AND SERVES THE AUDIO ON A NETWORK WHILE THE VIDEO IS DISPLAYED" filed on Sep. 2, 2013 are herein incorporated by reference.

FIELD OF TECHNOLOGY

This disclosure relates generally to wireless communication and specifically to the wireless delivery of an audio component that has been extracted from a multimedia channel while the visual component is played on a monitor.

BACKGROUND

When a video monitor is visible to many viewers, using loudspeakers to broadcast the accompanying audio may be problematic. Noise from the surrounding environment may interfere with the audio, different individuals may be viewing different video monitors, individuals who are not watching the video may not wish to hear the audio, different individuals may prefer the audio in different languages or sound levels, a video provider may be unable to gauge viewership, the available channels may be unknown or unchangeable by viewers, and a media provider may be unable to interact with viewers. Thus there is a need for methods, apparatus, and systems that transmit audio to wireless electronic devices such that the audio may be played in sync with the video playing on a video monitor. There is also need for methods, apparatus, and systems that allow a user to request which visual component is played on a video monitor or locate the video monitor that is playing a visual component of interest. There is further need for methods, apparatus, and systems that allow a server to select which visual component is played on a video monitor based on assessed interest and suggestions from users. In addition, there is need for methods, apparatus, and systems that allow a user of the wireless electronic device to review a channel listing and select one audio stream from a plurality of multimedia channels, and allow a user to receive and interact with visual content that is not the visual component of their selected multimedia channel.

SUMMARY

Disclosed are a method, system, and apparatus for providing an audio component of a multimedia channel to one or more wireless computing devices. In an example embodiment, an apparatus extracts the audio component of the multimedia channel while the visual component is playing on a video monitor. In one embodiment, the audio component is packetized into data packets and transmitted via a wireless network such that the data packets can be received by a wireless computing device and the audio component can be played by the wireless computing device in synchronization with the visual component playing on the video monitor.

In one aspect, the apparatus may serve to a wireless computing device a visual content that is not the visual component of the multimedia channel that the apparatus is streaming to the wireless computing device. In this aspect the user may watch or partially watch the visual component of the multimedia channel on a video monitor while they view or interact with the alternative visual content on their wireless computing device. This is useful when a user of a wireless computing device may wish to view and interact with alternative content while they stream an audio component of a multimedia channel. This is also useful when a multimedia provider, monitor owner, location host, or third party wishes to advertise to or interact with the user of the electronic device.

In one aspect, the wireless computing device may display a direction indicator showing the direction of the video monitor that is playing, or will play, the visual component of a multimedia channel. In this aspect the direction indicator may show the direction of the video monitor that is playing, or will play, the visual component of the multimedia channel having an audio component that the user has selected or may select for streaming to their wireless computing device. This is useful when a location has a plurality of video monitors showing a plurality of visual components and the user wants to view a particular visual component.

In one aspect, a wireless computing device may suggest that the apparatus set the visual component playing on a video monitor (e.g. set the TV channel) to a visual component of a user-selected multimedia channel, wherein the suggesting may comprise the user selecting the audio component of that user-selected multimedia channel. In one aspect the suggesting may comprise voting. In one aspect, the apparatus may also turn on a video monitor based in part on the suggestion of a wireless computing device. Before setting a visual component to play on a video monitor, the apparatus may consider the location of the suggesting wireless computing device relative to one or more video monitors, and may set the visual component playing on a video monitor if that video monitor is close to, or visible from, the wireless computing device. This is useful when a user of a wireless computing device may wish to view a particular visual component on a video monitor and stream the audio on their wireless computing device. For example a user may select the audio component of a football game and the apparatus may set the channel to play the visual component of that game on a video monitor near the user's table at a restaurant or bar while the user streams the audio to their mobile phone. Before setting a visual component to play on a video monitor, the apparatus may consider a count of some set of monitors and consider other suggestions (e.g. channel votes) from a plurality of wireless computing devices. The apparatus may set the visual component playing on a video monitor to accommodate or partially accommodate the channel votes from the plurality of wireless computing devices. This is useful when there are multiple wireless computing devices at a location having one or more video monitors and a plurality of multimedia channels, because voting may be used to partially accommodate the diverse channel preferences of the users of the multiple wireless computing devices. For example when a restaurant or bar is crowded with people and there are a plurality of multimedia channels available, user votes may be used determine what channels are played on the available video monitors.

In one aspect, the apparatus may assess interest in a visual component before or after turning on a video monitor or setting the channel of a video monitor. Interest may be assessed by the number or percentage of wireless computing devices that select a certain audio component, the number or percentage of wireless computing devices near that video monitor, the number or percentage of people near that video monitor, the number or percentage of wireless computing devices near another video monitor, the number or percentage of people near another video monitor, an apparatus configuration, an anticipated popularity, marketing metrics, ad spend, network analytics, social media mentions, polling, or another assessment of interest. Interest may also be assessed by a sensor (e.g. camera) tracking the number of people near a video monitor or the number of eyes looking at a video monitor.

The methods, systems, and apparatuses disclosed herein may be implemented in any means for achieving various aspects, and may be executed in a form of machine readable non-transient storage medium embodying a set of instruction that, when executed by a machine, causes the machine to perform any of the operations disclosed herein. Other features will be apparent from the accompanying drawing and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Figure 1:
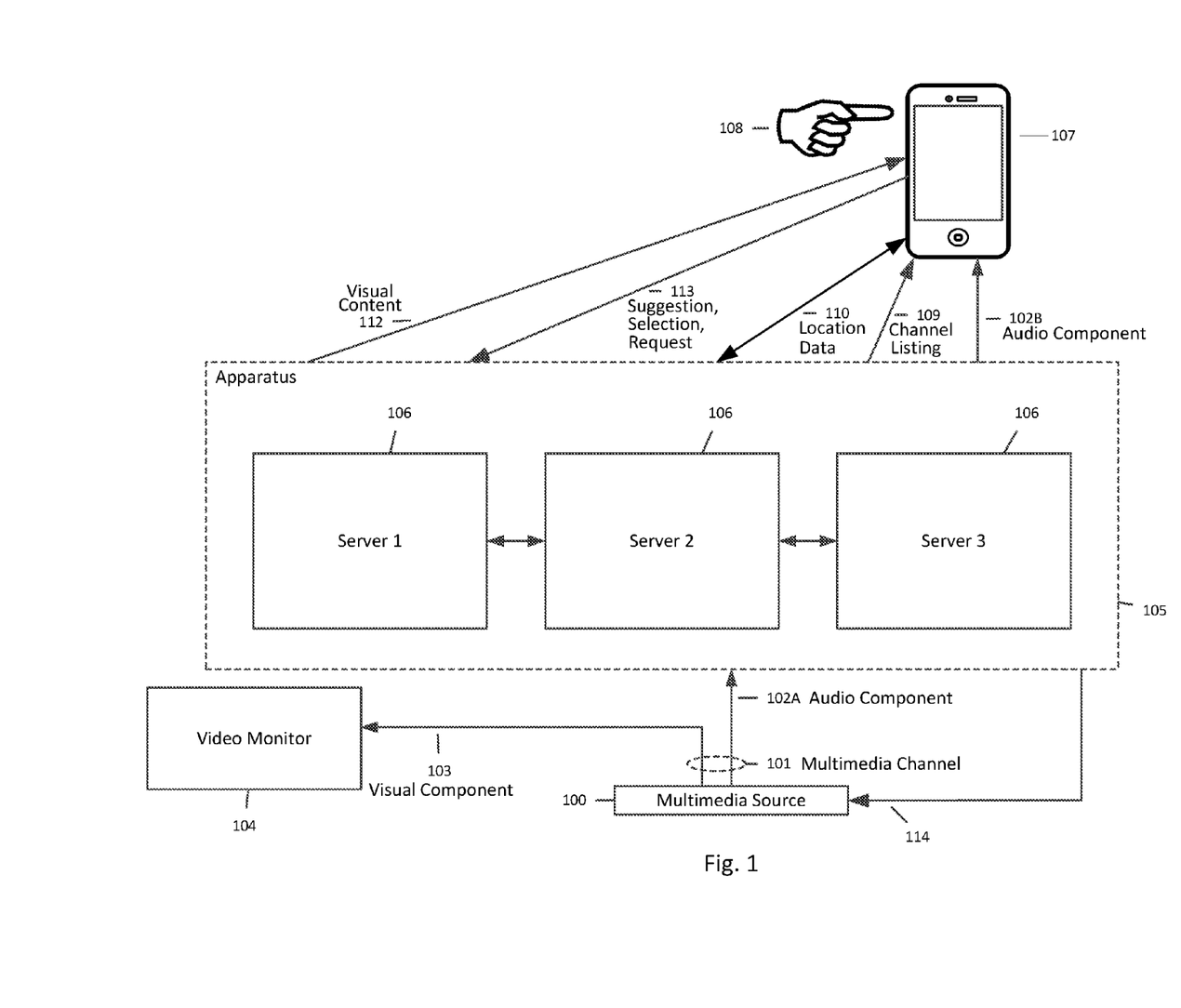
FIG. 1 is a block diagram of the apparatus, wireless computing device, multimedia source, and video monitor, according to one embodiment.
Figure 2:
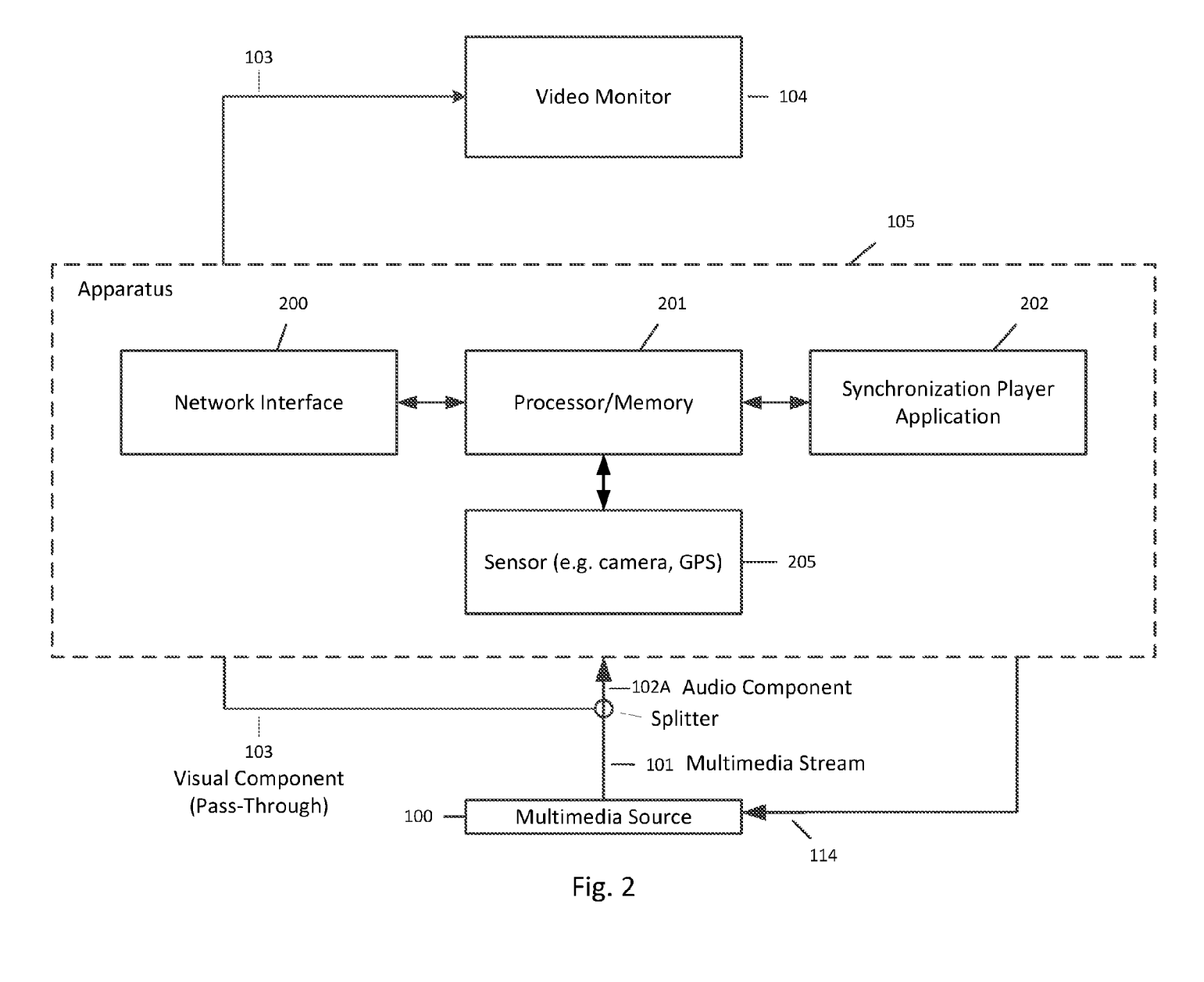
FIG. 2 is a block diagram of the apparatus, multimedia source, and video monitor, according to another embodiment.

A method, system, and apparatus provide an audio component 102 of a multimedia channel 101 to one or more wireless computing devices 107. Although the present embodiments have been described with reference to specific example embodiments, it will be evident that various modifications and changes may be made to these embodiments without departing from the broader spirit and scope of the various embodiments.

An apparatus 105 of the present application may also be called "Eyesync", "electronic display device", and "audio device". The video monitor 104 of the present application may also be called a "display". The multimedia channel 101 of the present application may also be called "multimedia content" and "multimedia stream". A multimedia channel 101 may comprise at least one visual component 103 and at least one audio component 102. A multimedia channel 101 may be one of a plurality of multimedia channels 101. "Synchronization" may mean that the audio and video are played with relative timing that is sufficient for human consumption.

In an example embodiment, an apparatus 105 extracts an audio component 102 of a multimedia channel 101 produced by a multimedia source 100 while the visual component 103 is playing on a video monitor 104. The audio component 102 is packetized into data packets and transmitted via a wireless network such that the data packets can be received by a wireless computing device 107 and the audio component 102 can be played by the wireless computing device 107 in synchronization with the visual component 103 playing on the video monitor 104.

The apparatus 105 may comprise: one or more audio inputs 102, one or more network interfaces 200, one or more processors with one or more memories 201, one or more sensors (e.g. camera, GPS) 205, and one or more applications 202 configured to extract the audio component 102 from the audio input 102, packetize the audio component 102 into data packets, and transmit the data packets via the network interface such that the data packets can be received by the wireless computing device 107 and the audio component 102 can be played by the wireless computing device 107 in synchronization with the visual component 103 playing on a video monitor 104. In one embodiment, the apparatus 105 does not output the visual component 103 and thus the apparatus 105 may not buffer the visual component 103. In another embodiment, the apparatus 105 may comprise one or more video inputs and outputs, and may output the visual component 103 after buffering (e.g. delaying) the visual component 103.

In one embodiment, the apparatus 105, may comprise one or more network servers 106 and a network server 106 may comprise one or more processors in one or more chassis. When there is a plurality of network servers 106 they may negotiate with each other to determine which one or more network servers 106 may become one or more channel servers, wherein the one or more channel servers may provide one or more service beacons and serve one or more channel listings 109 to wireless computing devices 107. This is useful in order to off-load these tasks from some of the network servers 106 or concentrate these tasks in one or more network servers 106. For example, one or more network servers 106 may be configured with addition compute power in order to take on these tasks. During the negotiation, the network servers 106 may consider or compare their excess processing power (e.g. their configurations) in order to determine which may have more excess processing power and, as a result, which may become the channel server(s). A network server 106 may also be a media server, wherein a media server may serve one or more audio components 102 to wireless computing devices 107. A network server 106 that is a channel server may also be a media server.

Figure 3:
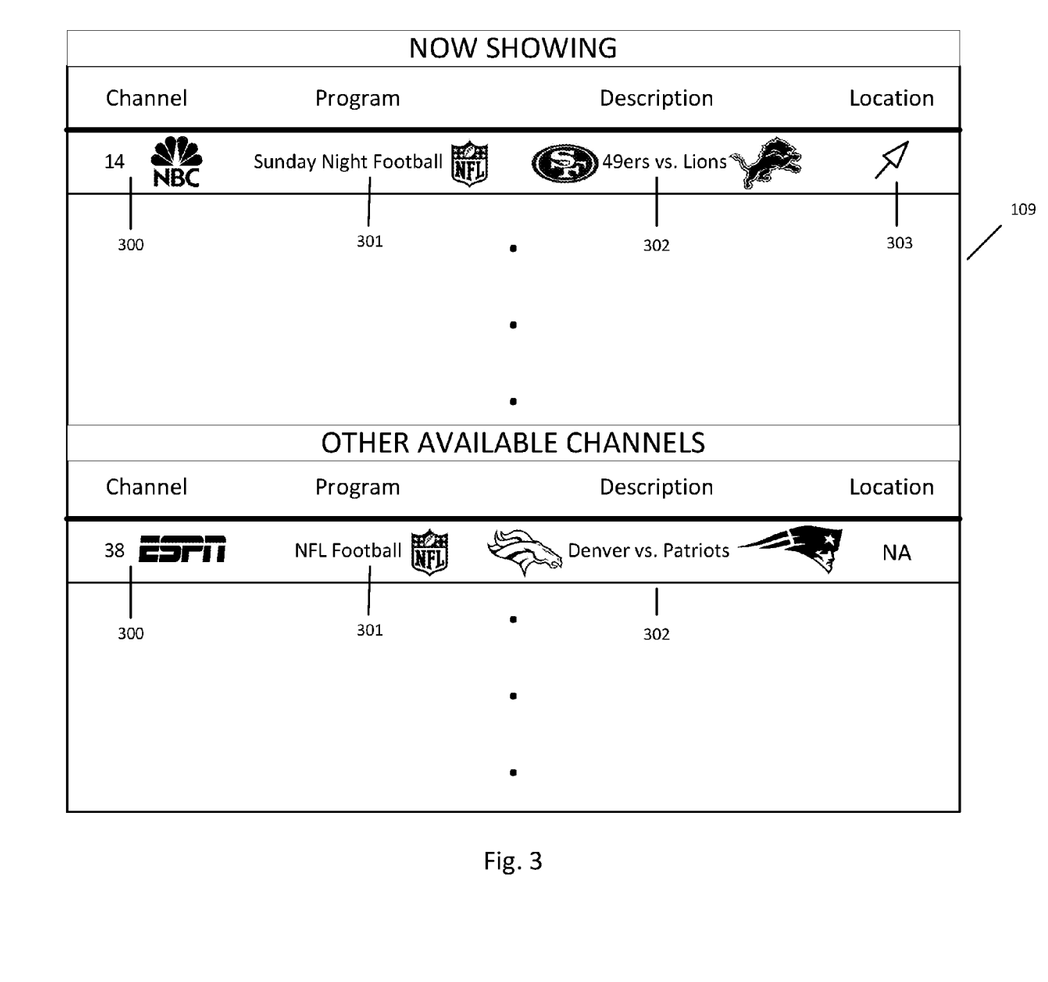
FIG. 3 is a diagram of a channel listing, according to one embodiment. The logos pictured are trademarks of their respective owners.

Thus, the apparatus 105 may serve to a wireless computing device 107 a channel listing 109 of the audio components 102 available on a local network. This is particularly useful when a plurality of visual components 103 are playing in close proximity and a user 108 may wish to consider the plurality of available audio components 102 before selecting 113 at least one. Furthermore, a method for providing an audio component 102 of a multimedia channel 101 to a wireless computing device 107 may comprise serving a channel listing 109 to the wireless computing device 107. The channel listing 109 may comprise one or more channel indicators 300 301 302, such as locally unique channel numbers or letters, assigned to each of the one or more multimedia channels 101, audio components 102, or visual components 103. The channel indicators 300 301 302 may comprise metadata of a channel or component, such as a channel name, a program name 301, a language, a video resolution, a channel graphic 300, and a program graphic 301. For example, a channel indicator 300 301 302 may comprise: a channel number (e.g. 2), a channel name (e.g. CBS San Francisco), a program name (e.g. Major League Baseball), a channel graphic (e.g. the CBS logo), and a program graphic (e.g. the MLB logo). The channel indicator 300 301 302 may also comprise other descriptive metadata, for example, a program summary (e.g. 49ers vs. Bears) 302, channel summary (e.g. Sports), and program or channel graphics 302 concerning the multimedia channel 101, audio component 102, or visual component 103. The metadata may also provide the language of the audio component 102 (e.g. "Spanish") or the video resolution (e.g. "HD" or "1080p" or "15,360×8,640 pixels"). The channel listing 109 may allow a user 108 of a wireless computing device 107 to view the channel indicator alternatives 300 301 302 (e.g. audio component 102 alternatives 300 301 302) and select 113 a channel indicator 300 301 302 or an audio component indicator 300 301 302. In response to the user's 108 selection 113 the apparatus 105 may extract, packetize, and wirelessly transmit, the selected 113 audio component 102. In turn, the wireless computing device 107 may receive the transmitted packets and play, using a client application, the selected 113 audio component 102 in synchronization with the visual component 103 of the associated multimedia channel 101. The apparatus 105 may also treat the selection 113 as a channel suggestion 113 or take another action.

In one embodiment, the apparatus 105 may wirelessly serve a channel listing 109 to a wireless computing device 107 in response to a wireless request 113 made by the wireless computing device 107. The channel listing 109 may inventory the audio components 102 of the multimedia channels 101 that are playing on one or more video monitors 104. The channel listing 109 may also inventory the audio components 102 of a plurality of multimedia channels 101 available to the apparatus 105 but not playing on any video monitor 104. The channel listing 109 may be a complete or partial listing. In one embodiment the apparatus 105 may advertise itself or a channel listing 109, or both, on a wireless network without receiving a request 113 from the wireless computing device 107. The apparatus 105 may communicate with the wireless computing device 107 using a network protocol for advertisement and discovery of network services, such as Simple Service Discovery Protocol (SSDP); Universal Plug and Play (UPnP); Service Location Protocol (SLP, srvloc); Bonjour® networking; Dynamic Host Configuration Protocol (DHCP); or another protocol supporting distributed systems. The apparatus 105 may acquire a network address of the wireless network and may assign a network address to a wireless server 106 of the apparatus 105. A wireless computing device 107 may discover the apparatus 105 and may receive the channel listing 109, may control the apparatus 105 or a network server 106 of the apparatus 105 by sending wireless commands to them, may receive wireless events from the apparatus 105 (e.g. network server 106), and may present a user 108 interface on the wireless computing device 107 to allow the user 108 to control the apparatus 105 or a server 106 of the apparatus 105 through the wireless network. The apparatus 105 may communicate with the wireless computing device 107 using unicast or multicast communication.

The wireless network used to serve the channel listing 109 may be the same wireless network used to transmit packets. Alternatively, the wireless network used to serve the channel listing 109 may be different than the wireless network used to transmit packets. A wireless network may be centralized or ad-hoc.

In one embodiment, the apparatus 105 may serve to a wireless computing device 107 a visual content 112 that is not the visual component 103 of the multimedia channel 101 that the apparatus 105 is streaming to the wireless computing device 107. In one embodiment the apparatus 105 may serve to a wireless computing device 107 a visual content 112 that is not the visual component 103 of any of the available multimedia channels 101. The visual content 112 may or may not enable the user 108 of the wireless computing device 107 to cause a different audio component 102 to be extracted, packetized, and transmitted from the apparatus 105. The visual content 112 may be marked as lower priority than the audio packets in order to help ensure that the wireless computing device 107 does not interrupt the audio component 102 in order to process the visual content 112. The visual content 112 may be an advertisement, interactive content, informative content, data gathering, promotion, sweepstakes, question, entertainment, or message. The topic of the visual content 112 may concern a multimedia channel 101, a visual component 103, or an audio component 102. The topic of the visual content 112 may concern a nominal location of the apparatus 105 (e.g. a business, a restaurant, a city, a region, a festival, a trade show, a common interest of the location's users 108). The topic of the visual content 112 may concern a communication between users 108, and may or may not be limited to users 108 at the location of the apparatus 105 (e.g. social engagement between wireless computing device users 108). The topic of the visual content 112 may comprise a predictive game (e.g. will the 49ers rush or pass on the next down) presented by the apparatus 105. The topic of the visual content 112 may comprise a question (e.g. trivia, feedback request) presented by the apparatus 105.

In one embodiment, the wireless computing device 107 may display a direction indicator 303 showing the direction of the video monitor 104 that is playing, or will play, the visual component 103 of a multimedia channel 101. In one embodiment the direction indicator 303 may show the direction of the video monitor 104 that is playing, or will play, the visual component 103 of the multimedia channel 101 having an audio component 102 that the user 108 has selected 113 for streaming to their wireless computing device 107. The direction indicator 303 may be, for example, an arrow, arrow head, polygon, pointing hand, or any symbol indicating a direction. Prior to the display of the direction indicator 303, the user 108 may request 113 the location 110 of a monitor 104 playing the visual component 103 of a particular multimedia channel 101 or audio component 102. The direction indicator 303 may be accompanied by a channel indicator 300 301 302 or other metadata 300 301 302. The direction indicator 303 may also be accompanied by a distance indicator 303 (e.g. graphical or numeric) showing the approximate distance of the video monitor 104. The length of the direction indicator 303 or a length of a portion of the direction indicator 303 (e.g. the arrow shaft) may indicate the distance of the video monitor 104. The wireless computing device 107 may compute the direction indicator 303 or distance indicator 303 from video monitor 104 location data 110 sent by the apparatus 105, may display a direction indicator 303 or distance indicator 303, may communicate its location data 110 to the apparatus 105, and may receive video monitor 104 direction or distance data from the apparatus 105.

In one embodiment, a wireless computing device 107 may select 113 an indicator (e.g. symbol) of one or more video monitors 104, or an indicator (e.g. symbol) of one or more viewing directions. This may allow a user 108 to select 113 one or more preferred video monitors 104 for viewing a visual component 103, a ranking or rating of video monitors 104 for viewing a visual component 103, one or more preferred viewing directions for viewing a visual component 103 (e.g. if the user 108 is in a north facing chair surrounded by video monitors), or a ranking or rating of viewing directions for viewing a visual component 103. In this aspect, a wireless computing device 107 may indicate a viewing direction by employing Hall sensors, or another direction sensor, acting as a compass in the device. Effectively, then, the orientation of a wireless computing device 107 may, by itself, indicate a preferred viewing direction. A wireless computing device 107 may also indicate a viewing direction when a user 108 selects 113 a viewing direction on a map displayed on the wireless computing device 107. Furthermore, a wireless computing device 107 may indicate a video monitor 104 when a user 108 selects 113 a monitor indicator (e.g. an icon or symbol of a monitor) on a location map displayed on the wireless computing device 107. A location map may be a map showing the video monitors 104 that are associated with the apparatus 105 and showing one or more local features, landmarks or monuments so the map may be correctly oriented by the user 108 or the wireless computing device 107. Data for a location map may be sent to the wireless computing device 107 from the apparatus 105 and the location map may be presented by a client application on the wireless computing device 107.

In one embodiment, a wireless computing device 107 may select 113 an audio component 102 of a multimedia channel 101 even if a visual component 103 of the multimedia channel 101 is not playing on any of the video monitors 104 that are associated with the apparatus 105. In such a case, the apparatus 105 may stream the selected 113 audio component 102 of the selected 113 multimedia channel 101 without playing a visual component 103 of the selected 113 multimedia channel 101.

In one embodiment, the apparatus 105 may consider setting 114 a visual component 103 of a selected 113 multimedia channel 101 to play on one or more video monitors 104. When a visual component 103 of a selected 113 multimedia channel 101 is already playing on one or more video monitors 104, the apparatus 105 may consider setting 114 a visual component 103 of the selected 113 multimedia channel 101 to play on additional, fewer, different, or no video monitors 104. When the apparatus 105 considers whether or where to play a visual component 103, the apparatus 105 may consider a count of some set of the video monitors 104 that are associated with the apparatus 105. The set may be the total set of associated video monitors 104, a subset, or the null set. For example, the set may be the set of the video monitors 104 that are playing a certain visual component 103 or the set of the video monitors 104 that are not playing a certain multimedia channel 101, or the set that are not playing anything at all (e.g. off). It is useful, for example, to count the video monitors 104 playing various visual components 103 if the objective is to adjust 114 the percentage of video monitors 104 so that it approximately reflects the demand for those various visual components 103. The apparatus 105 may consider a location 110 of any wireless computing device 107 relative to a location of any video monitor 104. This may be particularly useful when the apparatus 105 considers whether or where to play a visual component 103. For example, the apparatus 105 may consider the location 110 of the wireless computing device 107 that selected 113 a certain audio component 102 relative to the location of a nearby video monitor 104 and choose to play an unrelated visual component 103 on a different video monitor 104. It is useful, for example, to set 114 visual components 103 to play on video monitors 104 near the wireless computing devices 107 streaming the associated audio content 102, or to set 114 visual components 103 to play on video monitors 104 most viewable by the users 108 of the wireless computing devices 107 streaming the associated audio content 102 (e.g. in front of them).

In one embodiment, a wireless computing device 107 may suggest (e.g. vote) 113 that the apparatus 105 set 114 the visual component 103 playing on a video monitor 104 (e.g. set a TV channel) to the visual component 103 of a user-selected 113 audio component 102, wherein the suggesting 113 may comprise the user 108 selecting 113 an audio component 102 of a user-selected 113 multimedia channel 101. The suggesting 113 may also comprise the user 108 selecting 113 one or more video monitors 104. Thus, the user 108 may suggest 113 that the selected 113 audio component 102 be set 114 to play on any of the video monitors 104, or on one or more specific video monitors 104. The suggesting 113 may also comprise the user 108 selecting 113 a viewing direction (e.g. a preferred viewing direction). Prior to suggesting 113 that the apparatus 105 show a particular visual component 103 on a video monitor 104, a user 108 may browse or search a catalog (e.g. the channel listing) of multimedia channels 101, visual components 103, and/or audio components 102. The apparatus 105 may consider the location 110 of the wireless computing device 107 relative to the locations of one or more video monitors 104, and may set 114 the visual component 103 playing on a video monitor 104 if that video monitor 104 is close to, or in a preferred viewing direction of, the wireless computing device 107. The apparatus 105 may consider the location 110 of the wireless computing device 107 relative to the locations of one or more video monitors 104, and may set 114 the visual component 103 playing on a video monitor 104 if that video monitor 104 is in the selected 113 viewing direction, or is visible to a user 108 of the wireless computing device 107 (e.g. viewable by a user 108 near the wireless computing device 107; e.g. there is no wall between the wireless computing device 107 and the video monitor 104). The apparatus 105 may also consider channel votes 113 from one or more other wireless computing devices 107 and their locations 110 relative to the locations of a plurality of video monitors 104, and may set 114 the visual component 103 playing on a video monitor 104 in an attempt to accommodate or partially accommodate suggestions (e.g. votes) 113 from the one or more other wireless computing devices 107. The apparatus 105 may consider channel votes 113 from the one or more wireless computing devices 107 closest to a video monitor 104; the one or more wireless computing devices 107 that selected 113 a viewing direction that may encompass the video monitor 104; or from the one or more wireless computing devices 107 that have visibility of the video monitor 104 (e.g. viewable by a user 108 near the wireless computing device; e.g. there is no wall between the wireless computing device and the video monitor 104). The apparatus 105 may choose to play the visual component 103 of the user-selected 113 audio component 102 on one video monitor 104 but not another video monitor 104. For example, the apparatus 105 may set 114 the multimedia channel 101 of a plurality of video monitors 104 in order to minimize, or approximately minimize, the sum of the distances from each wireless computing device 107 having a channel suggestion 113, to the closest visible video monitor 104, in the selected 113 viewing direction, that is showing its user-selected 113 multimedia channel 101. The location 110 of a wireless computing device 107 relative to the location of a video monitor 104 may be determined using the GPS location 110 of the mobile device 107, the strength of the mobile device's signal at the video monitor 104, or using radiolocation of the mobile device 107. The location of a video monitor 104 may be a location (e.g. GPS) of the video monitor 104, a network server 106 location (e.g. GPS), or the location of a sensor (e.g. GPS) 205 near, on, or in the video monitor 104. The locations of video monitors 104 and the locations of walls may be enter by an administrator of the apparatus 105 or determined by a sensor 205 of the apparatus 105.

A channel suggestion 113 or channel vote 113 may comprise a selection 113, a ranking 113, a rating 113, a plurality of selections 113, or any means to indicate a preference 113. In one embodiment, a wireless computing device 107 may be given (e.g. by entering a password or another authentication means) a super-user status whereby the channel suggestions 113 of that wireless computing device 107 are given priority by the apparatus 105.

In one embodiment, the apparatus 105 may assess interest in a specific visual component 103 before turning on 114 a video monitor 104 or setting 114 a visual component 103 to show on a video monitor 104 (e.g. setting 114 the channel of a video monitor 104). The apparatus 105 may assess interest by the number or percentage of wireless computing devices 107 that select 113 a certain audio component 102. For example, the apparatus 105 may assess greater interest in a first sporting event if a greater number of wireless computing devices 107 select 113 the audio of the first sporting event compared to a second sporting event. The apparatus 105 may also assess interest by the number or percentage of people near the video monitor 104 or another video monitor. For example, the apparatus 105 may assess interest in a sporting event by determining that a large number of people are proximate to (or in a position to view) a video monitor 104 showing a visual component 103 of that event or that a small number of people are proximate to (or in a position to view) a video monitor 104 not showing the event. The proximity of people may be approximated by the proximity of wireless computing devices 107 using GPS, signal strength, or radio location; or by a sensor (e.g. camera) 205 that evaluates the area surrounding a video monitor 104 to determine the number of people nearby. For example, eye, face or body recognition may be used to evaluate the number of people near a video monitor 104. The apparatus 105 may further assess interest using a configuration. For example, the apparatus 105 may accept a content rating or content ranking of multimedia content or types of multimedia content of likely interest. In another example, the apparatus 105 may accept an hours listing of the facility's hours of operation and may turn off a video monitor 104 during hours outside of the hours of operation. The apparatus 105 may further assess interest using an anticipated popularity. For example, the apparatus 105 may poll individuals on a network to assess interest in a multimedia content. The apparatus 105 may also assess interest using marketing metrics. For example, the apparatus 105 may acquire click-through metrics from a web site to assess interest in a multimedia content. The apparatus 105 may also assess interest using ad spend. For example, the apparatus 105 may acquire ad-spend figures from an advertiser to assess interest in a multimedia content. The apparatus 105 may additionally assess interest using network analytics. For example, the apparatus 105 may acquire keyword analytics from a network search provider to assess interest in a multimedia content. The apparatus 105 may additionally assess interest using mentions on social media. For example, the apparatus 105 may acquire analytics from a social media provider or mine social media content to assess interest in a multimedia content. Interest may also be assessed by a sensor (e.g. camera) 205 tracking the number of people near the video monitor 104 or another video monitor 104; or the number of eyes looking at the video monitor 104 or another video monitor 104. For example, the apparatus 105 may use a video camera to determine that many eyes are looking at a video monitor 104 showing a multimedia content and, based on the assessed interest, set 114 another video monitor 104 to show the same content.

Figure 4:
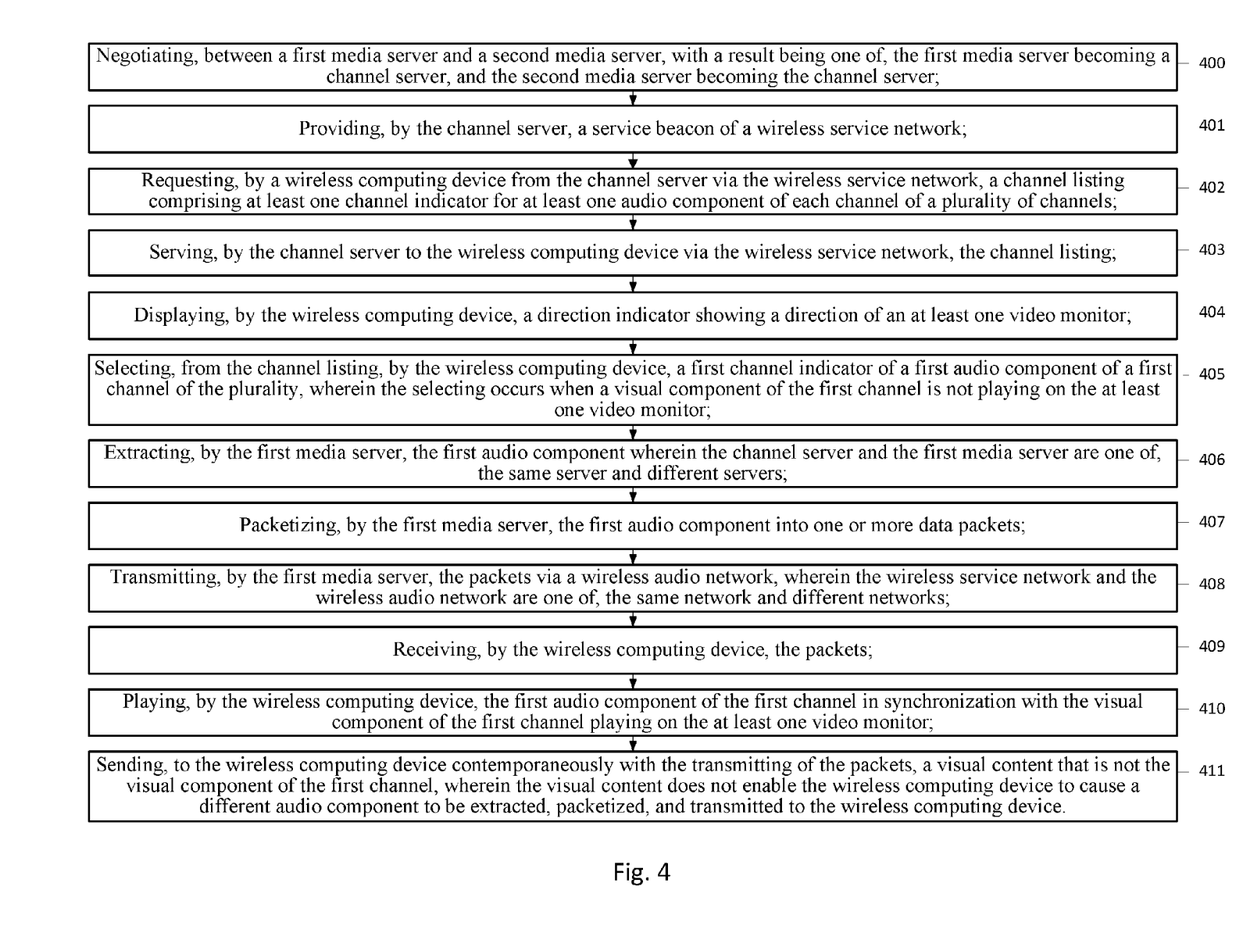
FIG. 4 is a block diagram of the method, according to one or more embodiments, wherein the steps may be in any order.

In one or more embodiments, the method may comprise: Negotiating 400, between a first media server and a second media server, with a result being one of, the first media server becoming a channel server, and the second media server becoming the channel server; providing 401, by the channel server, a service beacon of a wireless service network; requesting 402, by a wireless computing device from the channel server via the wireless service network, a channel listing comprising at least one channel indicator for at least one audio component of each channel of a plurality of channels; serving 403, by the channel server to the wireless computing device via the wireless service network, the channel listing; displaying 404, by the wireless computing device, a direction indicator showing a direction of an at least one video monitor; selecting 405 from the channel listing, by the wireless computing device, a first channel indicator of a first audio component of a first channel of the plurality, wherein the selecting occurs when a visual component of the first channel is not playing on the at least one video monitor; extracting 406, by the first media server, the first audio component wherein the channel server and the first media server are one of, the same server and different servers; packetizing 407, by the first media server, the first audio component into one or more data packets; transmitting 408, by the first media server, the packets via a wireless audio network, wherein the wireless service network and the wireless audio network are one of, the same network and different networks; receiving 409, by the wireless computing device, the packets; playing 410, by the wireless computing device, the first audio component of the first channel in synchronization with the visual component of the first channel playing on the at least one video monitor; and sending 411, to the wireless computing device contemporaneously with the transmitting of the packets, a visual content that is not the visual component of the first channel, wherein the visual content does not enable the wireless computing device to cause a different audio component to be extracted, packetized, and transmitted to the wireless computing device.

Figure 5:
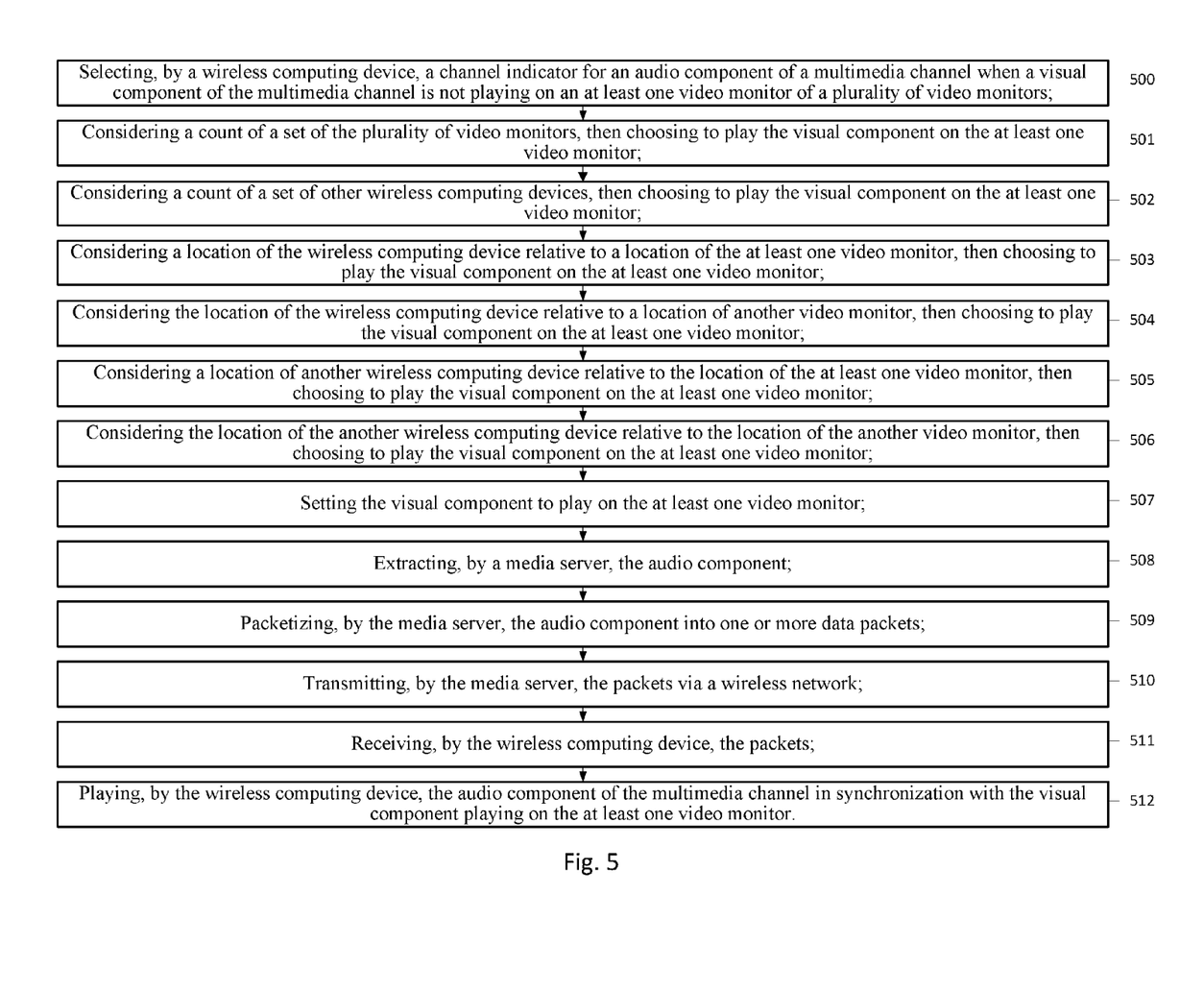
FIG. 5 is a block diagram of the method, according to other embodiments, wherein the steps may be in any order.

In one or more embodiments, the method may comprise: Selecting 500, by a wireless computing device, a channel indicator for an audio component of a multimedia channel when a visual component of the multimedia channel is not playing on an at least one video monitor of a plurality of video monitors; considering 501 a count of a set of the plurality of video monitors, then choosing to play the visual component on the at least one video monitor; considering 502 a count of a set of other wireless computing devices, then choosing to play the visual component on the at least one video monitor; considering 503 a location of the wireless computing device relative to a location of the at least one video monitor, then choosing to play the visual component on the at least one video monitor; considering 504 the location of the wireless computing device relative to a location of another video monitor, then choosing to play the visual component on the at least one video monitor; considering 505 a location of another wireless computing device relative to the location of the at least one video monitor, then choosing to play the visual component on the at least one video monitor; considering 506 the location of the another wireless computing device relative to the location of the another video monitor, then choosing to play the visual component on the at least one video monitor; setting 507 the visual component to play on the at least one video monitor; extracting 508, by a media server, the audio component; packetizing 509, by the media server, the audio component into one or more data packets; transmitting 510, by the media server, the packets via a wireless network; receiving 511, by the wireless computing device, the packets; playing 512, by the wireless computing device, the audio component of the multimedia channel in synchronization with the visual component playing on the at least one video monitor.

Figure 6:
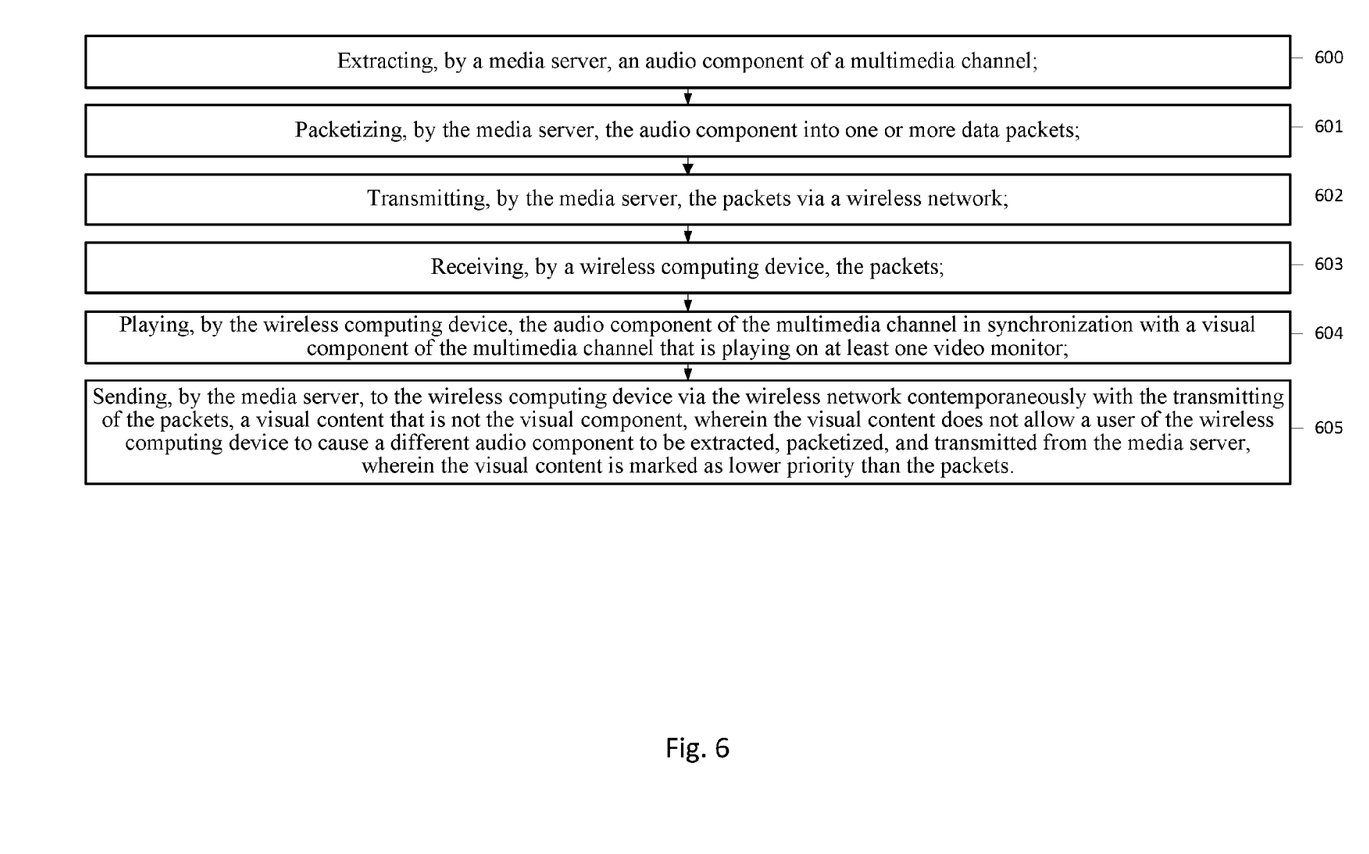
FIG. 6 is a block diagram of the method, according to still other embodiments, wherein the steps may be in any order.

In one or more embodiments, the method may comprise: extracting 600, by a media server, an audio component of a multimedia channel; packetizing 601, by the media server, the audio component into one or more data packets; transmitting 602, by the media server, the packets via a wireless network; receiving 603, by a wireless computing device, the packets; playing 604, by the wireless computing device, the audio component of the multimedia channel in synchronization with a visual component of the multimedia channel that is playing on at least one video monitor; and sending 605, by the media server, to the wireless computing device via the wireless network contemporaneously with the transmitting of the packets, a visual content that is not the visual component, wherein the visual content does not allow a user of the wireless computing device to cause a different audio component to be extracted, packetized, and transmitted from the media server, wherein the visual content is marked as lower priority than the packets.

In addition, the various operations, processes, and methods disclosed herein may be embodied in a non-transitory machine-readable medium and/or a machine accessible medium compatible with a data processing system, and may be performed in any order (e.g., including using means for achieving the various operations). Accordingly, the specification and drawings are to be regarded in an illustrative rather than a restrictive sense.

What is claimed is:

1. A method for providing an audio component of a multimedia channel to a wireless computing device wherein the multimedia channel comprises a visual component that is playing on at least one video monitor, the method comprising:
    extracting, by a media server, the audio component;
    packetizing, by the media server, the audio component into one or more data packets;
    transmitting, by the media server, the packets via a wireless network;
    receiving, by the wireless computing device, the packets;
    playing, by the wireless computing device, the audio component of the multimedia channel in synchronization with the visual component playing on the at least one video monitor while the visual component is not playing on the wireless computing device; and
    sending, by the media server to the wireless computing device via the wireless network contemporaneously with the transmitting of the packets, a visual content but not the visual component, wherein the visual content does not allow a user of the wireless computing device to cause a different audio portion to be extracted, packetized, and transmitted from the media server, wherein the visual content comprises an advertisement.

2. A method for providing an audio component of a multimedia channel to a wireless computing device wherein the multimedia channel comprises a visual component that is playing on at least one video monitor, the method comprising:
    extracting, by a media server, the audio component;
    packetizing, by the media server, the audio component into one or more data packets;
    transmitting, by the media server, the packets via a wireless network;
    receiving, by the wireless computing device, the packets;
    playing, by the wireless computing device, the audio component of the multimedia channel in synchronization with the visual component playing on the at least one video monitor while the visual component is not playing on the wireless computing device; and
    sending, by the media server to the wireless computing device via the wireless network contemporaneously with the transmitting of the packets, a visual content but not the visual component, wherein the visual content does not allow a user of the wireless computing device to cause a different audio portion to be extracted, packetized, and transmitted from the media server, wherein a topic of the visual content concerns at least one of the visual component and the audio component.

3. A method for providing an audio component of a multimedia channel to a wireless computing device wherein the multimedia channel comprises a visual component that is playing on at least one video monitor, the method comprising:
    extracting, by a media server, the audio component;
    packetizing, by the media server, the audio component into one or more data packets;
    transmitting, by the media server, the packets via a wireless network;
    receiving, by the wireless computing device, the packets;
    playing, by the wireless computing device, the audio component of the multimedia channel in synchronization with the visual component playing on the at least one video monitor while the visual component is not playing on the wireless computing device; and
    sending, by the media server to the wireless computing device via the wireless network contemporaneously with the transmitting of the packets, a visual content but not the visual component, wherein the visual content does not allow a user of the wireless computing device to cause a different audio portion to be extracted, packetized, and transmitted from the media server, wherein a topic of the visual content concerns a nominal location of the media server.

4. A method for providing an audio component of a multimedia channel to a wireless computing device wherein the multimedia channel comprises a visual component that is playing on at least one video monitor, the method comprising:
    extracting, by a media server, the audio component;

packetizing, by the media server, the audio component into one or more data packets;

transmitting, by the media server, the packets via a wireless network;

receiving, by the wireless computing device, the packets;

playing, by the wireless computing device, the audio component of the multimedia channel in synchronization with the visual component playing on the at least one video monitor while the visual component is not playing on the wireless computing device; and sending, by the media server to the wireless computing device via the wireless network contemporaneously with the transmitting of the packets, a visual content but not the visual component, wherein the visual content does not allow a user of the wireless computing device to cause a different audio portion to be extracted, packetized, and transmitted from the media server, wherein the visual content comprises a social engagement with another user of another wireless computing device wherein the engagement is presented by the media server via the wireless network.

5. A method for providing an audio component of a multimedia channel to a wireless computing device wherein the multimedia channel comprises a visual component that is playing on at least one video monitor, the method comprising:

extracting, by a media server, the audio component;

packetizing, by the media server, the audio component into one or more data packets;

transmitting, by the media server, the packets via a wireless network;

receiving, by the wireless computing device, the packets;

playing, by the wireless computing device, the audio component of the multimedia channel in synchronization with the visual component playing on the at least one video monitor while the visual component is not playing on the wireless computing device; and sending, by the media server to the wireless computing device via the wireless network contemporaneously with the transmitting of the packets, a visual content but not the visual component, wherein the visual content does not allow a user of the wireless computing device to cause a different audio portion to be extracted, packetized, and transmitted from the media server, wherein the visual content comprises a predictive game presented by the media server via the wireless network.

6. A method for providing an audio component of a multimedia channel to a wireless computing device wherein the multimedia channel comprises a visual component that is playing on at least one video monitor, the method comprising:

extracting, by a media server, the audio component;

packetizing, by the media server, the audio component into one or more data packets;

transmitting, by the media server, the packets via a wireless network;

receiving, by the wireless computing device, the packets;

playing, by the wireless computing device, the audio component of the multimedia channel in synchronization with the visual component playing on the at least one video monitor while the visual component is not playing on the wireless computing device; and sending, by the media server to the wireless computing device via the wireless network contemporaneously with the transmitting of the packets, a visual content but not the visual component, wherein the visual content does not allow a user of the wireless computing device to cause a different audio portion to be extracted, packetized, and transmitted from the media server, wherein the visual content comprises a question presented by the media server via the wireless network.

7. An apparatus configured to provide an audio component of a multimedia channel to a wireless computing device wherein the multimedia channel comprises a visual component that is playing on at least one video monitor, the apparatus comprising:

a network interface configured to communicate on a wireless network; and at least one processor configured to: extract the audio component; packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein the visual content comprises an advertisement.

8. An apparatus configured to provide an audio component of a multimedia channel to a wireless computing device wherein the multimedia channel comprises a visual component that is playing on at least one video monitor, the apparatus comprising:

a network interface configured to communicate on a wireless network; and at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein a topic of the visual content concerns at least one of the visual component and the audio component.

9. An apparatus configured to provide an audio component of a multimedia channel to a wireless computing device wherein the multimedia channel comprises a visual component that is playing on at least one video monitor, the apparatus comprising:

a network interface configured to communicate on a wireless network; and at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein a topic of the visual content concerns a nominal location of the network interface.

10. An apparatus configured to provide an audio component of a multimedia channel to a wireless computing device wherein the multimedia channel comprises a visual component that is playing on at least one video monitor, the apparatus comprising:
   a network interface configured to communicate on a wireless network; and
   at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein the visual content comprises a social engagement with another user of another wireless computing device wherein the engagement is presented by the network interface via the wireless network.

11. An apparatus configured to provide an audio component of a multimedia channel to a wireless computing device wherein the multimedia channel comprises a visual component that is playing on at least one video monitor, the apparatus comprising:
   a network interface configured to communicate on a wireless network; and
   at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein the visual content comprises a predictive game presented by the network interface via the wireless network.

12. An apparatus configured to provide an audio component of a multimedia channel to a wireless computing device wherein the multimedia channel comprises a visual component that is playing on at least one video monitor, the apparatus comprising:
   a network interface configured to communicate on a wireless network; and
   at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein the visual content comprises a question presented by the network interface via the wireless network.

13. A system for providing an audio component of a multimedia channel to a wireless computing device wherein the multimedia channel comprises a visual component that is playing on at least one video monitor, the system comprising:
   the audio component;
   a network interface configured to communicate on a wireless network; and
   at least one processor configured to: extract the audio component; packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein the visual content comprises an advertisement.

14. A system for providing an audio component of a multimedia channel to a wireless computing device wherein the multimedia channel comprises a visual component that is playing on at least one video monitor, the system comprising:
   the audio component;
   a network interface configured to communicate on a wireless network; and
   at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein a topic of the visual content concerns at least one of the visual component and the audio component.

15. A system for providing an audio component of a multimedia channel to a wireless computing device wherein the multimedia channel comprises a visual component that is playing on at least one video monitor, the system comprising:

the audio component;

a network interface configured to communicate on a wireless network; and at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein a topic of the visual content concerns a nominal location of the network interface.

16. A system for providing an audio component of a multimedia channel to a wireless computing device wherein the multimedia channel comprises a visual component that is playing on at least one video monitor, the system comprising:

the audio component;

a network interface configured to communicate on a wireless network; and at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein the visual content comprises a social engagement with another user of another wireless computing device wherein the engagement is presented by the network interface via the wireless network.

17. A system for providing an audio component of a multimedia channel to a wireless computing device wherein the multimedia channel comprises a visual component that is playing on at least one video monitor, the system comprising:

the audio component;

a network interface configured to communicate on a wireless network; and at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein the visual content comprises a predictive game presented by the network interface via the wireless network.

18. A system for providing an audio component of a multimedia channel to a wireless computing device wherein the multimedia channel comprises a visual component that is playing on at least one video monitor, the system comprising:

the audio component a network interface configured to communicate on a wireless network; and at least one processor configured to: extract the audio component packetize the audio component into one or more data packets; transmit the packets via the network interface such that the wireless computing device may receive the packets and play the audio component in synchronization with the visual component playing on the at least one video monitor while the visual component is not playing on the wireless computing device; and send, to the wireless computing device via the wireless network contemporaneously with the transmitting of the packets, a visual content but not the visual component, wherein the visual content does not allow a user of the wireless computing device to cause a different audio portion to be extracted, packetized, and transmitted via the wireless network, wherein the visual content comprises a question presented by the network interface via the wireless network.

* * * * *